United States Patent [19]

Nishikawa et al.

[11] Patent Number: 5,270,109

[45] Date of Patent: * Dec. 14, 1993

[54] MAGNETIC RECORDING MEDIUM HAVING A MAGNETIC LAYER COMPRISING FERROMAGNETIC POWDER, A BINDER AND A SPECIFIED ORGANOSILICON LUBRICANT COMPOUND

[75] Inventors: Yasuo Nishikawa; Akira Ushimaru; Kazuaki Taga; Masatoshi Takahashi, all of Kanagawa, Japan

[73] Assignee: Fuji Photo Film Co., Ltd., Kanagawa, Japan

[*] Notice: The portion of the term of this patent subsequent to Feb. 18, 2010 has been disclaimed.

[21] Appl. No.: 835,064

[22] Filed: Feb. 18, 1992

Related U.S. Application Data

[63] Continuation of Ser. No. 641,941, Jan. 16, 1991, abandoned.

[30] Foreign Application Priority Data

Jan. 17, 1990 [JP] Japan ................................ 2-7326
Jan. 24, 1990 [JP] Japan ................................ 2-14235

[51] Int. Cl.$^5$ .............................................. G11B 5/00
[52] U.S. Cl. ................................... 428/336; 428/64; 428/341; 428/447; 428/694 BF; 428/694 BM
[58] Field of Search ................. 428/64, 447, 694, 900, 428/694 BF, 694 BM, 341, 336; 252/49.6, 62.59

[56] References Cited

U.S. PATENT DOCUMENTS

| | | | |
|---|---|---|---|
| 3,761,311 | 9/1973 | Perrington et al. | 428/694 |
| 4,135,016 | 1/1979 | Ogawa et al. | 428/64 |
| 4,369,230 | 1/1983 | Kimura et al. | 428/421 |
| 4,788,001 | 11/1988 | Narula | 252/312 |

FOREIGN PATENT DOCUMENTS 57-012420 1/1982 Japan .

*Primary Examiner*—Stevan A. Resan
*Attorney, Agent, or Firm*—Sughrue, Mion, Zinn, Macpeak & Seas

[57] ABSTRACT

A magnetic recording medium is provided comprising a non-magnetic support having thereon at least one magnetic layer comprising a ferromagnetic powder, a binder, and at least one of organic silicone compounds represented by formulae (I-1) or (I-2);

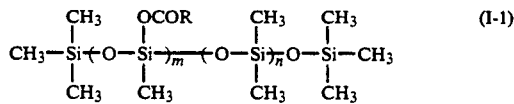

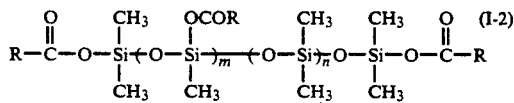

wherein R represents a branched saturated hydrocarbon group having from 7 to 24 carbon atoms; m represents an integer of from 1 to 100; n represents an integer of from 0 to 250; and $m \geq n/5$.

12 Claims, No Drawings

MAGNETIC RECORDING MEDIUM HAVING A MAGNETIC LAYER COMPRISING FERROMAGNETIC POWDER, A BINDER AND A SPECIFIED ORGANOSILICON LUBRICANT COMPOUND

This is a Continuation of application Ser. No. 07/641,941 filed Jan. 16, 1991, now abandoned.

FIELD OF THE INVENTION

This invention relates to a magnetic recording medium comprising a non-magnetic support having thereon a magnetic layer containing a ferromagnetic powder dispersed in a binder, and more specifically to a high-density magnetic recording medium having excellent running property and durability under wide temperature, humidity and running conditions, in particular, under a low-temperature condition or a widely variable running speed condition.

BACKGROUND OF THE INVENTION

In magnetic recording media technology, higher density recording capability has been demanded. As one of the means meeting this demand, it is known to smoothen the surface of the magnetic layer, for example, to smoothen the surface by further fining the particle sizes of the ferromagnetic powder which is used in the magnetic layer.

However, when the surface associated with a magnetic layer is smoothened, the friction coefficient due to the contact between the magnetic layer and an apparatus during running of the magnetic recording medium increases. As a result, the magnetic layer of the magnetic recording medium tends to be injured in a short period of time of running or the magnetic layer tends to be peeled off.

In an effect to solve this problem, lubricants such as fatty acids, fatty acid esters, hydrocarbons, silicone compounds, and the like, have been used.

Video tape recorders (VTR) and flexible disk drive apparatus, such as personal computers and word processors have been popularized and generally used. Also, magnetic recording media have been used in a wide range of environmental conditions such as under a low temperature or under a high-temperature high-humidity condition. Accordingly, a magnetic recording medium must be sufficiently stable such that the running durability thereof is not changed under various conditions that can be expected. However, the stability of the magnetic recording media using conventionally known lubricants still remains insufficient for fully attaining this object.

For instance, silicone compounds have been used in effects to solve the aforesaid running durability problem owing to the specific surface improving faculty and the excellent fluidity imparted by silicone compounds. For example, various fatty acid-modified silicone compounds were investigated for improving the retention of the lubricants on the magnetic layer of a magnetic recording medium as shown in JP-B-63-29333 (the term "JP-B" as used herein means an "examined Japanese patent publication), JP-A-60-1623, JP-A-56-169223, and JP-A-57-37735 (the term "JP-A" as used herein means an "unexamined published Japanese patent application."

However, when the fatty acid-modified silicone compound is a saturated fatty acid-modified silicone, the melting point (softening point) thereof becomes relatively high and the lubricating effect at lower temperatures is reduced. In comparison, when the silicone compound is an unsaturated fatty acid-modified silicone, the fluidity thereof is excellent, but when this type of silicone compound is applied to a very smooth magnetic recording medium which is excellent in high-density recording aptitude, the coefficient of static friction is increased, which is undesirable for the magnetic recording medium.

For example, JP-B-63-29333 discloses organic silicone compounds shown by following formula;

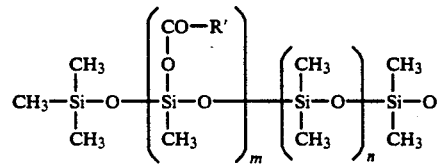

wherein R' represents a saturated or unsaturated hydrocarbon group having from 7 to 21 carbon atoms, m an n represent such integers as $1 \leq m < 150$, $0 \leq n$, $m+n \leq 1000$, and $m/n = 1/1000$ to $1/1$, When $R_1$ in the aforesaid silicone compound is selected to be a saturated or unsaturated straight chain hydrocarbon group having from 7 to 21 carbon atoms and the compound used as a lubricant, the lubricating property and the abrasion resistance of the magnetic layer are improved and also the running stability and the durability of the magnetic layer are improved. However, in the case of the saturated fatty acid-modified compound, the melting point (softening point) of the lubricant is relatively high. As a consequence, the lubricating effect at lower temperatures is reduced. Also, in the case of the unsaturated fatty acid-modified compound, the fluidity is excellent but the coefficient of static friction is increased.

Thus, other organic silicone compounds also have been proposed. Namely, the compounds represented by following formula (II) as described in JP-B-49-14249 and the compounds represented by following formula (III) described in JP-A-50-32904 have been proposed.

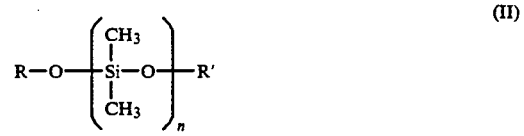

wherein R and R' each represents a hydrocarbon group having from 7 to 26 carbon atoms and n represents an integer of from 1 to 20.

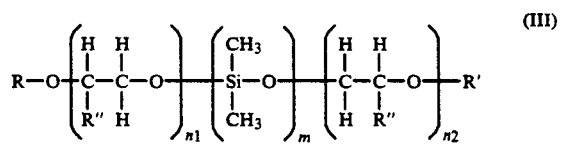

wherein R and R' each represents a hydrocarbon group having from 8 to 18 carbon atoms; each R" represents a hydrogen atom or a methyl group; $15 \geq m \geq 1$, and $16 \geq (n_1 + n_2) \geq 2$.

However, the use of the compound shown by the above-described formula (II) is undesirable since not only because the durability of the magnetic recording medium is not improved but also because the compound has a low compatibility with a binder which causes an excessive uncontrolled blooming phenomenon. Although not completely understood, this phenomenon can be attributed to the fact that the bond between the hydrocarbon bond and silicon is an ether bond which has poor polarity.

Also, it has been found that the use of the above-described compound represented by formula (III) is undesirable since the coefficient of kinematic friction of the magnetic recording tape with the head drum of a video tape recorder is increased at a heavy load to sometimes cause creak. Also, the durability of the magnetic recording medium is not significantly improved by the aforesaid compound. Although not completely understood, this result considered to be caused by the presence of the hydrophilic alkylene oxide chain in this silicone molecule.

Thus, as the result of investigations for solving the aforesaid problems, another proposal that has been offered involves a magnetic recording medium comprising a non-magnetic support having thereon a magnetic layer containing the organic silicone compound represented by following formula (IV) together with a ferromagnetic powder and a binder as described in JP-B-56-26890.

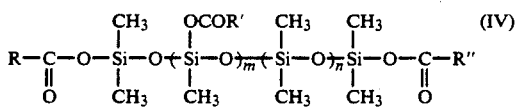

wherein R, R', and R" each represents a saturated or unsaturated hydrocarbon group having from 7 to 21 carbon atoms, m represents an integer of from 1 to 100; n represents an integer of from 0 to 250, $m+n \geq 300$, and $m \geq n/5$.

It has been found that by the aforesaid technique, a magnetic recording medium is obtained having a stable running property, an excellent abrasion resistance, a high durability and experiencing considerably less blooming phenomenon.

Recently, with the development of magnetic recording, recording of high image quality and high tone quality has been highly demanded. For meeting these demanded requirements, it has hitherto been practiced to fine the particle sizes and packing density of the ferromagnetic powder used in the magnetic recording medium.

Also, with the recent great increase in the use of magnetic recording media, techniques are needed which enable magnetic recording media to be produced at a lower cost. One example of such a technique involves the employment of a plural magnetic layers. In the plural magnetic layers, since the upper layer is imparted high image quality characteristics and the lower layer is imparted high tone quality characteristics, adequate amounts and types ferromagnetic powders can be independently selected for each of these layers, which facilitates achieving the goal of increasing density. Also, in the plural magnetic layers, other proper additives can be independently selected for in each layer so that only the particular properties desired in each layer need be provided, whereby the magnetic recording medium can be produced at a lower cost.

At present, conventional thinking considered that a method which improves the surface property of the surface of a magnetic layer is consequently effective for improving the electromagnetic characteristics of the magnetic recording medium. In the case of magnetic recording tape, for realizing the purpose of improving the surface property of the upper layer, the surface property of the lower layer also must be improved. Towards this end, if a binder having a low molecular weight is used in the lower layer to soften the lower layer, the surface property of the lower layer can be improved, whereby the magnetic recording tape having plural magnetic layers has excellent electromagnetic characteristics.

On the other hand, the electromagnetic characteristics of such a magnetic recording medium is a property which has been being evaluated on the presumption that the magnetic recording medium still will have a good running property maintained at an adequate level. Hence for ensuring the maintenance of good running property in the magnetic recording medium, it is necessary that the friction coefficient of the surface of the magnetic layer also be reduced as much as possible.

Accordingly, the good running property is preserved along with the obtained excellent electromagnetic characteristics of the magnetic recording medium by adding an effective amount of a lubricant to the upper layer and also the lower formed on a non-magnetic support.

However, when the aforesaid organic silicone compound represented by the above-described formula (IV) is used as a lubricant for the plural magnetic layers, there are problems are encountered in that a sufficient video output is not obtained, and in low-speed running and high-speed running, the coefficient of friction ($\mu$ value) observed after 100 running times is increased.

SUMMARY OF THE INVENTION

Thus, as the result of various investigations performed by the present inventors for solving the aforesaid problems, the present inventors have discovered that a magnetic layer, in particular plural magnetic layers are greatly influenced by the plasticizing action and the fluidity of a lubricant and the aforesaid problems associated with the above-discussed conventional techniques can be solved by using a branched and saturated fatty acid-modified silicone compound for a magnetic layer, in particular, for at least the uppermost magnetic layer.

A first object of this invention is, therefore, to provide a magnetic recording medium having an improved reproducing output and showing an excellent coefficient of friction both under high-temperature high-humidity condition and under a low temperature environment.

A second object of this invention is to provide a magnetic recording medium having excellent running property and durability under a wide range of running condition.

Also, another specific object of this invention is to provide a magnetic recording medium giving good video output and shows a good coefficient of friction under low-speed running and high-speed running conditions as maintained even after 100 running times.

That is, it is the present inventors' discovery that the aforesaid and other objects can be attained by the present invention as described in greater detail shown below.

This invention is to provide a magnetic recording medium comprising a non-magnetic support having thereon at least one magnetic layer comprising a ferromagnetic powder, a binder and at least one of organic silicone compounds represented by formulae (I-1) or (I-2);

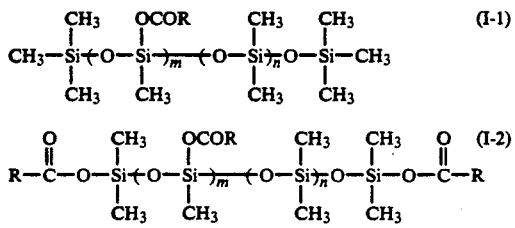

wherein R represents a branched saturated hydrocarbon group having from 7 to 24 carbon atoms and examples are provided hereinafter; m represents an integer of from 1 to 100; n represents an integer of from 0 to 250, and $m \geq n/5$. Particularly, it is preferred in this invention that $m+n \geq 300$.

In a preferred embodiment of this invention, the addition amount of the organic silicone compounds represented by the above formulae (I-1) or (I-2) is from 0.1 to 10% by weight based on the amount of the ferromagnetic powder in the magnetic layer.

In a further preferred embodiment of this invention, the aforesaid magnetic layer is composed of plural magnetic layers and the organic silicone compounds represented by the above formulae (I-1) or (I-2) are contained in the uppermost magnetic layer.

In an other preferred embodiment of this invention, the magnetic layer contains at least one of the organic silicone compound represented by the aforesaid formulae (I-1) or (I-2), wherein R represents one or more different kinds of hydrocarbon groups and each is a branched and saturated hydrocarbon group having from 7 to 24 carbon atoms and having two or more branched structures per hydrocarbon group.

DETAILED DESCRIPTION OF THE INVENTION

In this invention, by replacing the hydrocarbon group of the fatty acid moiety of a conventionally known fatty acid-modified silicone with a branched and saturated hydrocarbon group, the fluidity is imparted and the liquid lubricating property thereof is improved. An unmodified silicone compound is excellent in fluidity but since the silicon compound has a low compatibility with a binder, the silicon compound is unsuitable for use in a magnetic layer. However, in this invention, the fluidity and the compatibility of the silicone compound are simultaneously improved by the aforesaid modification. Further, the magnetic recording medium containing the silicone compound of this invention shows an excellent friction coefficient ($\mu$ value) under a wide range conditions varying from a low temperature to high-temperature and high-humidity.

In particular, when the magnetic recording medium of this invention has plural magnetic layers, in the case of using at least one of the organic silicone compounds represented by the above formulae (I-1) or (I-2), wherein R is a branched and saturated hydrocarbon group, the compatibility thereof with a binder becomes lower than the case of using the organic silicone compound of the formula wherein R is a straight hydrocarbon group. Therefore, the silicone compound in this invention does not plasticize the binder in the magnetic layer, and is liable to move in the magnetic layer owing to the high fluidity thereof, and a necessary amount of the organic silicone compound can be always supplied on the surface of the magnetic layer even when the silicone compound on the surface of the magnetic layer is consumed. Accordingly, a magnetic recording medium having an excellent running property and durability under a wide tape running condition varying from a low speed to a high speed is obtained without deteriorating the electromagnetic characteristics.

In particular, a magnetic recording medium having plural magnetic layers having a favorable recording aptitude in a wide range of operation conditions also can have very excellent electromagnetic characteristics. Yet since a fine-grain ferromagnetic powder is conventionally used in an uppermost magnetic layer suited for high recording density, the surface of the uppermost layer is thus very smooth, and it is likely to become difficult to increase the running property of the magnetic recording medium. On the other hand, by using such a modified silicone compound represented by aforesaid formulae (I-1) or (I-2) in this invention in at least the uppermost layer, both the electromagnetic characteristics and the running property can be improved.

Also, it has been found that in the case of using the branched fatty acid-modified organic silicone of the aforesaid formulae (I-1) and (I-2), wherein the hydrocarbon group of the fatty acid moiety which is used for the modification has two or more branched structures per group, intermolecular sliding of the compounds is particularly good and the magnetic recording medium having an excellent running property, that is, an excellent lubricity from a low speed to a high-speed (which has never been attained by using conventional silicone oils) is obtained.

As the organic silicone compounds in this invention represented by the aforesaid formulae (I-1) or (I-2), suitable examples include any silicone compounds modified by acylation with a branched and saturated higher fatty acid having the carbon atoms in the specific range and which can be used in a wide molecular weight range regardless of the extensivity of the branch structures. However, the fatty acid-modified silicone compound having a molecular weight of at least 1,000 is preferred and, further, the branched fatty acid-modified silicone compound having a molecular weight of at least 1,000 is more preferred. The particularly preferred molecular weight is from 5,000 or more.

In the aforesaid formulae (I-1) or (I-2), R is preferably a branched and saturated hydrocarbon group having preferably from 9 to 21 carbon atoms and more preferably from 13 to 21.

Specific examples of the branched and saturated hydrocarbon group represented by R in the aforesaid formulae (I-1) or (I-2) include 2-position branched fatty acid-type hydrocarbon groups such as $-CH(C_6H_{13})C_8H_{17}$, $-CH(C_7H_{15})C_9H_{19}$, $-CH(C_8H_{17})C_{10}H_{21}$, $-CH(C_{10}H_{21})C_{12}H_{25}$, and the like, saturated hydrocarbon groups having a complicated branched structure produced by an oxo method (e.g., isostearic acid series hydrocarbon made by Nissan Chemical Industries, Ltd.), and a mixture of isomer structures of straight chain aliphatic groups each having a branched methyl group as the side chain (e.g., methyl-branched fatty acids, made by Emery Industries, Inc.).

The above-mentioned branched fatty acids are derived from in the branched fatty acids formed by the formation of side-products by means of (1) Guerbet method (as described in *Encyclopedia Chimica* published Kyoritsu Shuppan), (2) oxo method, or (3) dimer acid synthesis.

Particularly preferred silicone compounds are branched fatty acid-modified silicone compounds wherein the fatty acid being used at the synthesis of silicone oil is isostearic acid synthesized by an oxo method.

Representative examples of the organic silicone compound represented by formula (I-1) are Compounds A to H and Compound J shown below, provided that compounds I, K, L and M are comparative compounds for Example 1.

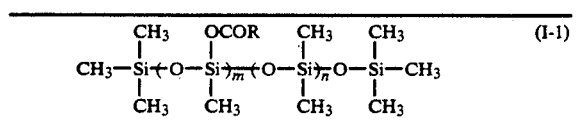
(I-1)

| Compound | m | n | R |
|---|---|---|---|
| A | 25 | 73 | Oxo-method isostearine residue (originated in isostearic acid, made by Nissan Chemical Industries, Ltd.) |
| B | 25 | 73 | 1-Heptyldecyl group |
| C | 50 | 48 | Oxo-method isostearic acid residue (isostearic acid residue, made by Nissan Chemical Industries, Ltd.) |
| D | 1 | 4 | Oxo-method isostearic acid residue (isostearic acid residue, made by Nissan Chemical Industries, Ltd.) |
| E | 100 | 180 | Oxo-method isostearic acid residue (isostearic acid residue, made by Nissan Chemical Industries, Ltd.) |
| F | 25 | 100 | Oxo-method isostearic acid residue (isostearic acid residue, made by Nissan Chemical Industries, Ltd.) |
| G | 50 | 230 | Oxo-method isostearic acid residue (isostearic acid residue, made by Nissan Chemical Industries, Ltd.) |
| H | 75 | 230 | Oxo-method isostearic acid residue (isostearic acid residue, made by Nissan Chemical Industries, Ltd.) |
| I | 50 | 270 | Oxo-method isostearic acid residue (isostearic acid residue, made by Nissan Chemical Industries, Ltd.) |
| J | 100 | 240 | Oxo-method isostearic acid residue (isostearic acid residue, made by Nissan Chemical Industries, Ltd.) |
| K | 25 | 73 | Heptadecyl group (stearic acid residue) |
| L | 25 | 73 | Oleic acid residue |
| M | 150 | 200 | 1-Heptyldecyl group |

Also, representative examples of the silicone compound represented by formula (I-2) are shown below.

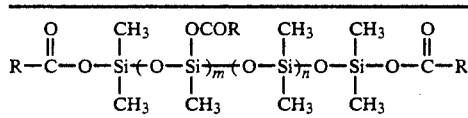

R: Oxo-method isostearic acid residue (originated in isostearic acid, made by Nissan Chemical Industries, Ltd.)
n = 70
m = 25 (Compound 1)

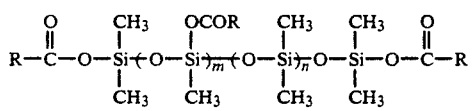

R: Guerbet-method isostearic acid (R: 2-Heptylundecanoic acid residue)
n = 70
m = 25 (Compound 2)

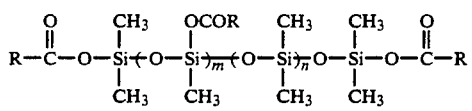

R: 2-Ethylhexanoic acid residue
n = 70
m = 20 (Compound 3)

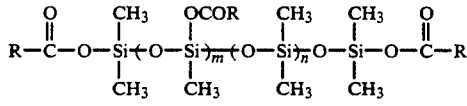

R: 1:1 Mixture of oleic acid residue and oxo-method isostearic acid residue
n = 3
m = 2 (Compound 4)

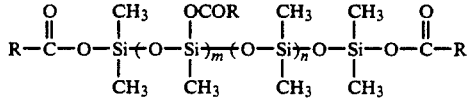

R: Methyl branched structure $C_{17}H_{35}$ (originated in isostearic acid made by Emery Industries, Inc.)
n = 20
m = 60 (Compound 5)

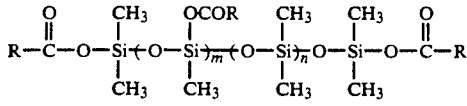

R: 1-Decyltridecyl group
n = 20
m = 70 (Compound 6)

-continued

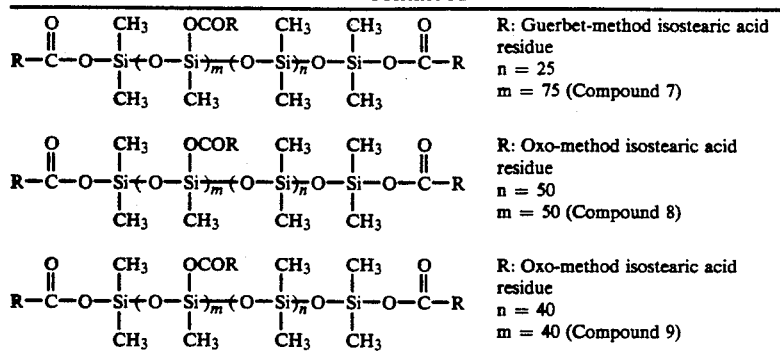

The amount of the aforesaid organic silicone compound of formulae (I-1) or (I-2) in this invention is generally from 0.1 to 10% by weight, preferably from 0.1 to 5% by weight, and particularly preferably from 0.5 to 3% by weight based on the amount of the ferromagnetic powder in the case of incorporating the organic silicone compound in the magnetic layer of the magnetic recording medium. Also, the amount of the organic silicone compound is generally from 2 to 50 mg/m² (preferably from 10 to 30 mg/m²) in the case of top-coating the organic silicone compound on the surface of the magnetic layer of the magnetic recording medium.

If the amount of the silicone compound exceeds the aforesaid value of 10%, the organic silicone compound existing on the surface of the magnetic layer can become excessive and can cause a problem such as sticking. Also, in the case of incorporating the silicone compound in the magnetic layer, there occurs a problem that the durability of the magnetic recording medium is reduced by the action of plasticization of the binder in the magnetic layer.

If the amount of the silicone compound is less than the value of 0.1%, the amount of the silicone compound on the surface can be become insufficient and the effect thereof is not obtained.

When the magnetic recording medium of this invention has plural magnetic layers, it is preferred that the dry thickness of the uppermost layer is 3.5 μm or less, and preferably 2.0 μm or less.

When the magnetic layer structure is composed of the uppermost layer and an other layer (s) (when "other layer" is composed plural layers, the average value load-averaged at the existing ratio in the magnetic recording tape), it is preferable that the BET specific area of the ferromagnetic powder in the uppermost layer differs from that of other layer(s) (or the average value of the other layers), preferably by at least 5 m²/g.

Further, in this invention, a nonmagnetic layer further may be provided as an interlayer or under-layer unless the effect of this invention is prevented.

In he magnetic recording medium having plural magnetic layers, it is preferable that the specific area (average) by a BET method of the ferromagnetic powder in the other layer(s) (hereinafter, referred to as lower layer), which is not the uppermost layer (i.e., the magnetic layer farthest removed from the support), is not more than 45 m²/g and the crystallite size (average) thereof is at least 290 Å. It is more preferable that the specific area by BET of the ferromagnetic powder in the uppermost layer is at least 30 m²/g and the crystallite size thereof is at least 400 Å, and the specific area by BET of the ferromagnetic powder in the lower layer is less than that of the uppermost layer. As explained above, it is more preferred that the aforesaid difference between the specific area by BET of the ferromagnetic powder in the lower layer and that of the uppermost layer is at least 5 m²/g.

It is difficult to form a uniform multilayer type magnetic layer wherein the uppermost layer has a thickness of not greater than 3.5 μm in thickness by a successive double coating system wherein the uppermost layer is coated on the lower layer in a dried state. However, by employing a simultaneous or successive wet-on-wet type double coating system, such as described in JP-A-62-212933, the magnetic recording medium capable of showing the features of this invention can be obtained.

In this invention, other lubricant may be used together with the aforesaid organic silicone compound of this invention.

Examples of such lubricants include metal salts of a saturated or unsaturated fatty acid (e.g., myristic acid, stearic acid, and oleic acid), fatty acid amides, fatty acid esters (e.g., various kinds of monoesters, fatty acid esters of polyhydric esters such as sorbitan, glycerol, etc., and ester compounds of polybasic acids), higher aliphatic alcohols, monoalkyl phosphates, dialkyl phosphates, trialkyl phosphates, and the metal salts or ammonium salts of these phosphates, alkanephosphonic acid or the salts thereof, alkylsulfuric acid or the salts thereof, paraffins, silicone oils, animal and vegetable oils, mineral oils, higher aliphatic amines, inorganic fine powders (e.g., graphite, silica, molybdenum disulfide and tungsten disulfide), fine powders of a resin (e.g., polyethylene, polypropylene, polyvinyl chloride, an ethylene-vinyl chloride copolymer, and polytetrafluoroethylene), α-olefin polymers, unsaturated aliphatic hydrocarbons which are in liquid states at normal room temperatures, fluorocarbons, fluorine-substituted ester compounds, and perfluoroalkyl polyethers.

The preferred amount of the aforesaid additional lubricants depends upon the using mode thereof but is generally from 1/10 to 2 times the amount of the organic silicone compound of this invention.

When the magnetic recording medium of this invention has plural magnetic layers, the kind of the amount of these lubricants and surface active agents which are used in this invention can be, if desired, changed for each layer.

Also, all or a part of the additives which are used in this invention may be added to the coating composition in any stage of producing the magnetic coating composition. For example, the additives may be mixed with a ferromagnetic powder before kneading or may be added in the step of kneading a ferromagnetic powder, a binder, and a solvent or may be added to the coating composition immediately before coating.

As methods of using the organic silicone compound of this invention, methods include a method of incorporating the organic silicone compound into a magnetic layer and a method of top-coating the silicone compound on the surface of the magnetic layer. Examples of the latter-mentioned method include e.g., a method of coating or spraying a solution of the organic silicone compound dissolved in an organic solvent on the magnetic layer of a magnetic recording medium followed by drying, a method of applying the molten organic silicone compound on the magnetic layer; a method of dipping a non-magnetic support having the magnetic layer in a solution of the organic silicone compound dissolved in an organic solvent to adsorb the silicone compound on the surface of the magnetic layer thereof; and a method of forming the layer of the organic silicone compound by a Langmuir-Blodgett method.

In the case of the coating type magnetic recording medium of this invention, there are no particular restrictions on the composition of the ferromagnetic powder being used (e.g., ferromagnetic iron oxides, cobalt-containing iron oxides, ferromagnetic iron-base alloys, and barium ferrite), particle sizes thereof, and the surface treatment manner of the ferromagnetic powder.

There is also no particular restriction on the form of the ferromagnetic powder for use in this invention but usually an acicular, granular, die-form, ellipsoidal form, or plate-like ferromagnetic particles are used. The crystallite sizes of the ferromagnetic powder (measured by X-ray diffraction) are preferably not larger than 450 due to electromagnetic characteristics considerations.

The binder for forming the magnetic layer in this invention can be selected from ordinary binders being used in the field of the art. Examples of the binder include a vinyl chloride-vinyl acetate copolymer, a copolymer of vinyl chloride, vinyl acetate and vinyl alcohol, maleic and/or acrylic acid, a vinyl chloridevinylidene chloride copolymer, a vinyl chlorideacrylonitrile copolymer, an ethylene-vinyl acetate copolymer, cellulose derivatives such as a nitrocellulose resin, and the like, acrylic resins, polyvinyl acetal resins, polyvinyl butyral resins, epoxy resins, phenoxy resins, polyurethane resins, and polycarbonate polyurethane resins.

For further increasing dispersibility of the ferromagnetic powder and the durability of the magnetic recording medium, it is preferred that the aforesaid binders have a polar group such as an epoxy group, $CO_2H$, $OH$, $NH_2$, $SO_3M$, $OSO_3M$, $PO_3M_2$, and $OPO_3M_2$ (wherein M represents a hydrogen atom, an alkali metal, or ammonium and when M is plurality, said M groups may be the same or different). The content of the polar group is preferably from $1 \times 10^{-7}$ to $1 \times 10^{-3}$ equivalent, and more preferably from $1 \times 10^{-6}$ to $1 \times 10^{-4}$ equivalent, per gram of the polymer.

The above-described binders are used singly or as a mixture thereof and the binder is frequently hardened by adding a known isocyanate series crosslinking agent.

Also, the organic silicone compound of this invention can be applied to a binder system wherein an acrylic acid ester series oligomer and a monomer are used as a binder and the binder is hardened by exposure to irradiation.

As the material for the non-magnetic support, there include polyesters such as polyethylene terephthalate, polyethylene 2,6-naphthalate, and the like; polyolefins such as polyethylene, polypropylene, and the like; cellulose derivatives such as cellulose triacetate, and the like; and resins such as polycarbonate, polyimide, polyamidoimide, and the like. If desired, the support may be metallized by aluminum, and the like.

The thickness of the support is generally from 3 to 100 μm. More specifically the thickness of the support for a magnetic tape is preferably from 3 to 20 μm and the thickness of the support for a magnetic disk is usually from 20 to 100 μm.

The content of the total binders in the magnetic layer of the magnetic recording medium of this invention is usually from 10 to 100 parts by weight, preferably from 10 to 60 parts by weight, and more preferably from 20 to 40 parts by weight per 100 parts by weight of the ferromagnetic powder in the magnetic layer.

It is preferable that the magnetic layer of the magnetic recording medium of this invention contains type of inorganic particles as long as a Mohs' hardness of at least 5.

There is no particular restriction on the inorganic particles if the Mohs' hardness thereof is at least 5.

Examples of the inorganic particles which can be used in this invention include $Al_2O_3$ (i.e., $\alpha$-$Al_2O_3$ having the $\alpha$-conversion of at least 90% and $\beta$-$Al_2O_3$) (Mohs' hardness: 9), TiO (Mohs' hardness: 6), $TiO_2$ (Mohs' hardness: 6.5), $SiO_2$ (Mohs' hardness: 7), $SnO_2$ (Mohs' hardness: 6.5), $Cr_2O_3$ (Mohs' hardness: 9), and $\alpha$-$Fe_2O_3$ (Mohs' hardness: 5.5).

These inorganic particles may be used alone or as a mixture of two or more kinds thereof.

Further, inorganic particles having a Mohs' hardness of at least 8 are particularly preferred. If inorganic particles having a Mohs' hardness of lower than 5 are used, the inorganic particles are liable to drop off the magnetic layer and they give almost no polishing action on a magnetic head whereby the head is liable to be clogged, and, as a result, the magnetic recording medium is poor in running durability.

The content of the inorganic particles is usually in the range of from 0.1 to 20 parts by weight, and preferably in the range of from 1 to 10 parts by weight per 100 parts by weight of the ferromagnetic powder.

Also, it is preferred that the magnetic layer further contains carbon black (in particular, having a mean grain size of from 10 to 300 nm (i.e., nanometer (nm)=$10^{-9}$ m)), in addition to the inorganic particles.

Hereinafter, the production process of the magnetic recording medium of this invention is described.

First, a magnetic coating composition is prepared by kneading a ferromagnetic powder, a binder, the organic silicone compound of this invention, and, if desired other fillers and additives are added with a solvent.

As the solvent which is used during kneading, conventional organic solvents which are usually used for the preparation of magnetic coating compositions can be employed.

There is no particular restriction on the kneading method, and the addition order of the components can be properly selected.

For example, the binder, solvent and ferromagnetic powder may be previously kneaded, and then the solution of hardening agent may be added to the resulting mixture or the lubricant may be added to the mixture in the state of solution at last.

In the kneading step, it is preferred to conduct strong kneading using a kneader, and the like, and also it is more preferred to use a pressure kneader, a continuous kneader, and the like, having a very strong kneading power.

In the case of using a continuous kneader or a pressure kneader, all or a part of the ferromagnetic powder and binder (preferably 30% or more of the total binders) are kneaded with an organic solvent present in an amount of from 15 to 500% by weight based on the ferromagnetic powder.

Details of the kneading treatment is described, for example, in JP-A-1-106338 and JP-A-64-79279.

At the preparation of the magnetic coating composition, a dispersing agent, an antistatic agent, and other additives such as other lubricants other than the organic silicone compound of this invention can be used.

Examples of the dispersing agent which can be used in this invention include fatty acids having from 12 to 22 carbon atoms, the salts or ester compounds of these fatty acids and the compounds wherein a part or all of the hydrogen atoms of the salts or ester compounds of these fatty acids are substituted by fluorine atoms, the amides of the aforesaid fatty acids, aliphatic amines, higher alcohols, polyalkylene oxide alkylphosphoric acid esters, alkylphosphoric acid esters, alkylboric acid esters, sarcosinate, alkyl ether esters, trialkyl polyolefins, oxy-quaternary ammonium salts, and lecithin.

In the case of using a dispersing agent, the amount thereof is usually from 0.1 to 10 parts by weight per 100 parts by weight of the ferromagnetic powder.

Examples of the antistatic agent which can be used in this invention include electric conductive fine powders of carbon black, a carbon black graft polymer, and the like; natural surface active agents such as saponin, and the like; nonionic surface active agents such as alkylene oxide series, glycerol series and glycidol series surface active agents; cationic surface active agents such as higher alkylamines, quaternary ammonium salts, salts of heterocyclic compounds such as pyridine, and the like; phosphoniums, sulfoniums, and the like; anionic surface active agents containing an acid group such as carboxylic acid, phosphoric acid, a sulfuric acid ester group, a phosphoric acid ester group, and the like; and amphoteric surface active agents such as amino acids, aminosulfonic acids, sulfuric acid esters or phosphoric acid esters of amino alcohol, and the like.

In the case of using the aforesaid electrically conductive fine particles as an antistatic agent, the amount thereof is from 0.1 to 10 parts by weight per 100 parts by weight of the ferromagnetic powder and in the case of using the surface active agent as an antistatic agent, the amount thereof is used in the range of from 0.12 to 10 parts by weight per 100 parts by weight of the ferromagnetic powder.

In addition, the aforesaid additives such as a dispersing agent, an antistatic agent, a lubricant., and the like, were not described in the strict meaning that each only has the aforesaid functionality and effect but, for example, a dispersing agent can also act as a lubricant or an antistatic agent. Accordingly, as a matter of course, the overall action and effect of the various compounds illustrated under the aforesaid classifications of additives are not necessarily limited to only the function described in each classification. Moreover, when a compound giving plural actions and effects is used, the addition amount of additives can be correspondingly reduced if desired.

The magnetic coating composition thus prepared is coated on the non-magnetic support. The coating composition may be directly coated on the non-magnetic support or may be coated thereon through an interlayer such as an adhesive layer. The interlayer is a layer composed of an adhesive alone or a layer composed of a binder having dispersed therein non-magnetic fine particles such as carbon black, and the like.

The binder for the interlayer containing carbon black can be optionally selected from the aforesaid various binders which also are used for the magnetic layers.

The grain size of carbon black for the interlayer is preferably from 10 to 50 nm and the ratio of binder/carbon black is preferably from 100/10 to 100/150 by weight ratio. The thickness of the interlayer is preferably from 0.1 to 2 $\mu$m in the case of a simple adhesive layer and from 0.5 to 4 $\mu$m in the case of containing non-magnetic particles. The interlayer may further contain a lubricant which also is used for the magnetic layer; or other types of conventional lubricants.

Details of the dispersing method of the aforesaid ferromagnetic powder and the binder and the coating method of the magnetic coating composition on a non-magnetic support are described in JP-A-54-46011 and JP-A-54-21805. The thickness of the magnetic layer thus coated is generally in the range of from about 0.5 to 10 $\mu$m, and preferably in the range of from 0.7 to 6.0 $\mu$m as a dry thickness. However, as explained above, the thickness of the uppermost magnetic layer is preferably not greater than 3.5 $\mu$m.

When the magnetic recording medium is used as a magnetic recording tape, the magnetic layer coated on the non-magnetic support is subjected to an orientation treatment in a magnetic field to orient the ferromagnetic powder in the magnetic layer and dried. Also, the magnetic recording medium is used as a disk medium, the medium is subjected to non-orientation treatment by a magnetic field to remove the anisotropy of the magnetic characteristics.

Thereafter, the magnetic recording medium is, if desired, subjected to a surface smoothing treatment.

In this invention, by replacing a hydrocarbon group of the fatty acid moiety of a conventionally known fatty acid-modified silicone with a branched and saturated hydrocarbon group, the so-called pour point, where flow begins when the temperature is changed from a low temperature to a high temperature, becomes lower than the straight chain fatty acid-modified silicone and the silicone shows remarkable fluid lubricating properties even at a low temperature (e.g., $-10°$ C.). A non-modified silicone oil has a good fluidity, and also when the silicone is modified by a straight chain fatty acid for increasing the compatibility with a binder, the pour point is increased as described above. However, when the silicone compound is modified with a branched and saturated fatty acid as in this invention is used, the compatibility with a binder can be improved while keeping as low a pour point as with the non-modified silicone compound.

As described above, by using the branched and saturated fatty acid-modified silicone compound of the invention, a magnetic recording medium showing a good coefficient of friction in particular at conditions of high-temperature and high-humidity or at a low temperature ($-10°$ C.), and giving a good generation output is obtained in this invention.

The reason for the showing of a good coefficient of friction at high-temperature and high-humidity is considered to be as follows. Specifically, the branched hydrocarbon (i.e., alkyl) group has a large effective surface area per group and also imparts a large hydrophobic property effect. Accordingly, the magnetic recording medium of this invention containing the inventive organic silicone compound is resistant to the influence of water or moisture and thus shows the excellent properties under a high-temperature and very high humidity.

In this invention, by incorporating the branched and saturated fatty acid-modified silicone compound in at least the uppermost layer of the plural magnetic layers of the magnetic recording medium, the magnetic recording medium shows a more excellent coefficient of friction under a wide tape running condition of from a low speed to a high speed without deteriorating the electromagnetic characteristics. The reason for this is not yet fully understood but it is considered that the organic silicone compound modified by a branched and saturated fatty acid has a low compatibility with a binder, and does not have a function of plasticizing the magnetic layer, and that the molecule itself is liable to move or migrate because the fatty acid is a branched fatty acid, whereby the silicone compound is liable to migrate in the magnetic layer.

Also, it is considered that when the organic silicone compound on the surface of the magnetic layer is lost by running of the magnetic recording medium over surfaces, replenishing silicone compound can be immediately supplied to the magnetic layer surface from the interior of the magnetic layer. Hence, when the extent of the consumption of the organic silicone compound is changed or varied between low-speed running and high-speed running, the organic silicone compound can be quickly supplied to the magnetic layer surface in an amount corresponding to the change.

Also, the magnetic recording medium of this invention has plural magnetic layers and when the organic silicone compound in this invention is used for any magnetic layer, the magnetic layer is hardened without being plasticized which improves the durability of the magnetic recording medium. In particular, when the organic silicone compound is used in the uppermost layer, the more remarkable effect in this regard is obtained. On the other hand, for ensuring the calendering effect and increasing the surface property, the lower magnetic layer is preferably a relatively soft layer.

As discussed above, the organic silicone compound for use in this invention is liable to move or migrate to the uppermost layer side of the recording medium owing to the aforesaid easy mobility of the organic silicone compound. Moreover, the present invention provides a proper softness to the lower magnetic layer, gives good calendering property, does not plasticize the magnetic layers, and has an excellent supplying faculty, whereby the aforesaid effects of this invention are obtained.

This invention is further explained by the following illustrative examples but the present invention is not to be construed as limited to these examples. The parts in the examples are all "by weight".

EXAMPLE 1

The following components for the magnetic layer composition were kneaded and dispersed for 48 hours using a ball mill. Thereafter, 5 parts of polyisocyanate was added followed by kneading for one hour, and then the composition was filtered using a filter having pores of a mean pore diameter of 1 μm to provide a magnetic coating composition. The magnetic coating composition obtained was coated on the surface of a polyethylene terephthalate support having a thickness of 10 μm at a dry thickness of 4.0 μm using a reverse roll.

| Composition for Magnetic Layer | |
|---|---|
| Ferromagnetic alloy powder (Fe 94%, Zn 4%, and Ni 2%; coercive force: 1500 Oe; specific surface area: 54 mg/m²) | 100 parts |
| Polyester series polyurethane (weight average molecular weight: 40,000, number average molecular: 25,000, having on an average 2 SO₃Na groups per one molecule) | 5 parts |
| Vinyl chloride/vinyl acetate/maleic anhydride copolymer (400X110A, trade name, made by Nippon Zeon K.K., polymerization degree 400) | 12 parts |
| Abrasive (α-alumina, mean particle size 0.3 μm) | 5 parts |
| Lubricant Compound | (described in Table 1) |
| Oleic Acid | 1 part |
| Carbon black (mean grain size 40 nm) | 2 parts |
| Methyl ethyl ketone | 300 parts |

The magnetic layer thus coated on the non-magnetic support was subjected to magnetic orientation treatment by a magnet of 3000 Gauss in the undried state, dried, and after applying a super calender treatment, the magnetic recording medium thus formed was slit into 8 mm width to provide a 8 mm video tape.

Then, signals of 7 MHz were recorded on the video tape thus obtained using VTR (FUJIX-8, made by Fuji Photo Film Co. Ltd.) and reproduced.

In this case, when the reproducing output of the signals of 7 MHz recorded on a video tape of Comparison Example 1 was defined as 0 dB for a standard, the relative reproducing outputs of other video tapes were measured.

Also, each video tape obtained was brought into contact (winding angle of 180° with a stainless steel pole at a tension ($T_1$) of 50 g and the tension ($T_2$) required for running the video tape at a speed of 3.3 cm/sec. under the aforesaid condition was measured. Based on the measured value, the coefficient of friction ($\mu$) of each video tape was determined by the following equation.

$$\mu = 1/\pi \cdot \ln(T_2/T_1)$$

In addition, the test for the coefficient of friction was conducted under the two conditions, i.e., a: $-10°$ C., 80% RH and b: 40° C., 80% RH.

The results obtained are shown in Table 1 below.

TABLE 1

| No. | Lubricant Compound | Amount of Lubricant Compound (part by weight) | Reproducing Output (dB) | Coefficient of Friction $-10°$ C. | 40° C. 80% RH |
|---|---|---|---|---|---|
| 1-1 | A | 1 | +1 | 0.18 | 0.2 |
| 1-2 | B | 1 | +1 | 0.19 | 0.2 |
| 1-3 | C | 1 | +0.5 | 0.19 | 0.19 |
| 1-4 | D | 1 | +0.5 | 0.2 | 0.2 |
| 1-5 | E | 1 | +0.5 | 0.2 | 0.22 |
| 1-6 | F | 1 | +1 | 0.2 | 0.2 |
| 1-7 | G | 1 | +1 | 0.2 | 0.21 |
| 1-8 | H | 1 | +1 | 0.2 | 0.2 |
| 1-9 | I | 1 | 0 | 0.25 | 0.45 |
| 1-10 | J | 1 | +1 | 0.19 | 0.20 |
| 1-11 | K | 1 | 0 | 0.2 | 0.42 |

TABLE 1-continued

| No. | Lubricant Compound | Amount of Lubricant Compound (part by weight) | Reproducing Output (dB) | Coefficient of Friction −10° C. | Coefficient of Friction 40° C. 80% RH |
|---|---|---|---|---|---|
| 1-12 | L | 1 | 0 | 0.2 | 0.45 |
| 1-13 | A | 1.5 | +1 | 0.2 | 0.19 |
| 1-14 | A | 3 | +1 | 0.18 | 0.18 |
| 1-15 | M | 1 | 0 | 0.2 | 0.43 |

*The lubricant compounds are described above.

As is apparent from the results shown in Table 1, Sample Nos. 1-1 to 1-8, 1-10, 1-13, and 1-14 using the organic silicone compounds of this invention have a high reproducing output and show a low coefficient of friction under both the conditions a and b.

On the other hand, in the cases of not using the organic silicone compounds in this invention, and using the conventional silicones, fatty acids, and esters only, there are problems that the reproducing output is low and the coefficient of friction under, particularly a low temperature (condition a), is large.

EXAMPLE 2

Coating compositions for magnetic layers shown below were prepared.

| Coating Composition for 1st Magnetic layer (lower Layer) | |
|---|---|
| Co-doped γ-Fe$_2$O$_3$ (Hc: 650 Oe, Specific surface area by BET method: 30 m$^2$/g, tap density*: 0.82) | 100 parts |
| Vinyl chloride copolymer (400X 110A, trade name, made by Electro Chemical Industry Co., Ltd.) | 11 parts |
| Polyester polyurethane resin (Crisvon 7209, trade name, made by Dainippon Ink and Chemicals, Inc.) | 6 parts |
| Carbon black (mean particle size: 18 nm) | 10 parts |
| γ-Fe$_2$O$_3$ (mean particle size: 0.5 μm) | 10 parts |
| Myristic acid | 1 part |
| Lubricant Compound | (shown in Table 2) |
| Methyl ethyl ketone | 220 parts |
| Coating Composition for 2nd Magnetic layer (upper Layer) | |
| Co-doped γ-Fe$_2$O$_3$ (Hc: 700 Oe, Specific surface area by BET method: 40 m$^2$/g, tap density: 0.82) | 100 parts |
| Vinyl chloride series copolymer (400X 110A, trade name, made by Electro Chemical Industry Co., Ltd.) | 11 parts |
| Polyester polyurethane resin (Crisvon 7209, trade name, made by Dainippon Ink and Chemicals, Inc.) | 6 parts |
| Carbon black (mean particle size: 50 nm) | 5 parts |
| α-Fe$_2$O$_3$ (mean particle size: 0.3 μm) | 7 parts |
| Myristic acid | 1 part |
| Lubricant Compound | (shown in Table 2) |

*The tap density was measured under the condition (numbers of tap: 150, head: 30 mm) by Tap Density Measuring Instrument, KYT-3000 manufactured by Seishin Kigyo K.K.

Each of the two coating compositions was kneaded for from 1 to 5 hours using an open kneader manufactured by Moriyama Seisakusho K.K. and then dispersed for from 1 to 10 hours using a sand grinder.

To each dispersion were added 6 parts of polyisocyanate (Coronate L, trade name, made by Nippon Polyurethane Co., Ltd.) and 35 parts of methyl ethyl ketone and each dispersion was filtered with a filter having an average pore size of 1 μm to provide the coating compositions for the 1st magnetic layer and the 2nd magnetic layer.

The coating composition for the lower layer was coated on a polyethylene terephthalate support of 15 μm in thickness while running the support at a speed of 60 meters/min. at a thickness of (a), defined in Table 2, using a reverse roll. Thereafter, the coating composition for the upper layer was coated thereon at a dry thickness of (b), defined in Table 2, using a reverse roll, before completely drying the lower magnetic layer. The upper magnetic layer was oriented by a magnet, and after drying, the upper magnetic layer was subjected to a super calender treatment. The magnetic recording medium thus obtained was slit into ½ inch width to provide each video tape.

(1) Video Output

Using VTR AG6800 (trade name, made by Matsushita Electric Industrial Co., Ltd.), the RF output of each video tape to a standard video tape, Super AG T120 (trade name, made by Fuji Photo Film Co., Ltd.) was measured.

(2) Coefficient of Friction

Each tape was rubbed against a Permalloy head and the load at applying a load of 50 g was measured. (One measurement: 30 cm (one stroke))

On two kinds of speeds of 0.1 mm/sec and 10 mm/sec., the initial load and the load of rubbing 100 times were measured.

The results obtained are shown in Table 2 below.

In addition, the structure of the comparison lubricants (i.e., conventional lubricants) shown in Table 2 are as follows.

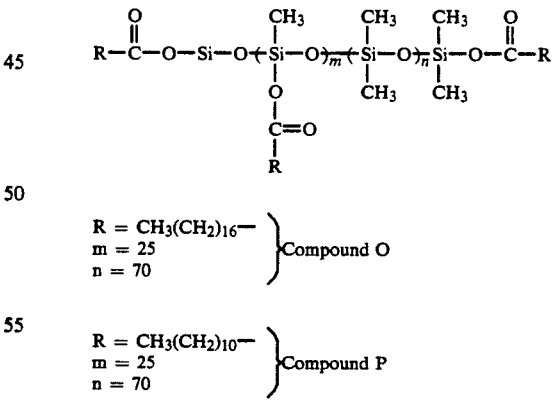

TABLE 2

| No. | Thickness of Lower Layer (a) (μm) | Thickness of Upper Layer (b) (μm) | Lubricant Compound for Lower Layer** Kind | Lubricant Compound for Lower Layer** Amount (part) | Lubricant Compound for Upper Layer Kind | Lubricant Compound for Upper Layer Amount (part) | Video Output ((dB) | 0.1 mm/sec Beginning | 0.1 mm/sec After 100 times rubbing | 10 mm/sec Beginning | 10 mm/sec After 100 times rubbing |
|---|---|---|---|---|---|---|---|---|---|---|---|
| 2-1 | 2.5 | 1.8 | Compound 1 | 1 | Compound 1 | 1 | 2 | 0.18 | 0.2 | 0.19 | 0.2 |

TABLE 2-continued

| No. | Thickness of Lower Layer (a) (μm) | Thickness of Upper Layer (b) (μm) | Lubricant Compound for Lower Layer** Kind | Amount (part) | Lubricant Compound for Upper Layer Kind | Amount (part) | Video Output ((dB)) | 0.1 mm/sec Beginning | 0.1 mm/sec After 100 times rubbing | 10 mm/sec Beginning | 10 mm/sec After 100 times rubbing |
|---|---|---|---|---|---|---|---|---|---|---|---|
| 2-2 | 2.5 | 1.8 | Compound 2 | 1 | Compound 1 | 1 | 1.5 | 0.18 | 0.19 | 0.19 | 0.2 |
| 2-3 | 2.5 | 1.8 | Compound 4 | 1 | Compound 1 | 1 | 2 | 0.18 | 0.2 | 0.18 | 0.2 |
| 2-4 | 2.5 | 1.8 | Compound 2 | 1 | Compound 2 | 1 | 1.5 | 0.19 | 0.2 | 0.2 | 0.21 |
| 2-5 | 2.5 | 1.8 | Compound 8 | 1 | Compound 8 | 1 | 1.5 | 0.18 | 0.2 | 0.2 | 0.2 |
| 2-6 | 2.5 | 1.8 | Compound 9 | 1 | Compound 9 | 1 | 1.5 | 0.19 | 0.19 | 0.2 | 0.2 |
| 2-7 | 2.5 | 1.8 | Compound A | 1 | Compound 1 | 1 | 1.5 | 0.18 | 0.2 | 0.2 | 0.2 |
| 2-8 | 2.5 | 1.8 | Compound O | 1 | Compound O | 1 | 0 | 0.22 | 0.4 | 0.2 | 0.35 |
| 2-9 | 2.5 | 1.8 | Compound P | 1 | Compound P | 1 | 0 | 0.24 | 0.5 | 0.2 | 0.4 |
| 2-10 | 0 | 4.1 | — | — | Compound O | 1 | 0 | 0.19 | 0.28 | 0.19 | 0.35 |
| 2-11 | 0 | 4.1 | — | — | Compound P | 1 | 0 | 0.2 | 0.29 | 0.2 | 0.4 |

**Compounds 1-9 are as described above.

As is apparent from the results shown in Table 2, Sample Nos. 2-1 to 2-7 containing the branched and saturated fatty acid-modified organic silicone compound in this invention in the upper magnetic layer of the plural magnetic layer structure thereof shows an excellent video output and low coefficient of friction in the range of from a low speed (0.1 mm/sec.) to a high speed (10 mm/sec.) not only at the beginning but also after rubbing 100 times.

On the other hand, Sample Nos. 2-8 and 2-9 using the conventional straight chain fatty acid-modified organic silicone compound markedly increased the friction coefficient after rubbing 100 times and also in Sample Nos. 2-10 and 2-11 using the aforesaid conventional organic silicone compounds O or P in a single magnetic layer, the coefficient of friction was also increased after rubbing 100 times.

Also, in the case of Samples Nos. 2-8 to 2-11 (comparison samples), the video output was also lowered.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a non-magnetic support having thereon at least one magnetic layer comprising a ferromagnetic powder, a binder and at least one organic silicone compound represented by formulae (I-1) or (I-2):

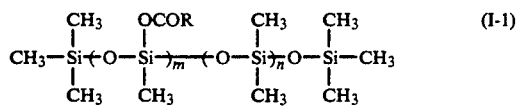

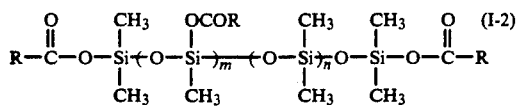

wherein R represents a branched and saturated hydrocarbon group having from 7 to 24 carbon atoms which can be the same or different, and said branched and saturated hydrocarbon group comprises two or more branched structures per hydrocarbon group; m represents an integer of from 1 to 100; n represents an integer of from 0 to 250; and m≧n/5.

2. A magnetic recording medium as in claim 1, wherein an amount of said organic silicone compounds represented by formulae (I-1) or (I-2) is from 0.1 to 10% by weight based on the amount of the ferromagnetic powder.

3. A magnetic recording medium as in claim 1, wherein the magnetic layer is composed of plural magnetic layers and the organic silicone compounds represented by the formulae (I-1) or (I-2) are contained in an uppermost magnetic layer.

4. A magnetic recording medium as in claim 1, wherein R represents a branched fatty acid hydrocarbon group branched at the number two position.

5. A magnetic recording medium as in claim 4, wherein R is selected from the group consisting of $-CH(C_6H_{13})C_8H_{17}$, $-CH(C_7H_{15})C_9H_{19}$, $-CH(C_8H_{17})C_{10}H_{21}$, and $-CH(C_{10}H_{21})C_{12}H_{25}$.

6. A magnetic recording medium as in claim 1, wherein said organic silicone compound has a molecular weight of at least 1,000.

7. A magnetic recording medium as in claim 1, wherein R contains 13 to 21 carbon atoms.

8. A magnetic recording medium as in claim 1, wherein the organic silicone compound is top-coated on the surface of said magnetic layer in an amount of 2 to 50 mg/m².

9. A magnetic recording medium as in claim 3, wherein the thickness of said uppermost magnetic layer is 3.5 μm or less.

10. A magnetic recording medium as in claim 1, wherein said at least one organic silicone compound comprises a compound of said formula (I-1).

11. A magnetic recording medium as in claim 1, wherein said at least one organic silicone compound comprises a compound of said formula (I-2).

12. A magnetic recording medium as in claim 1, wherein m+n≧300.

* * * * *